Patented Mar. 11, 1930

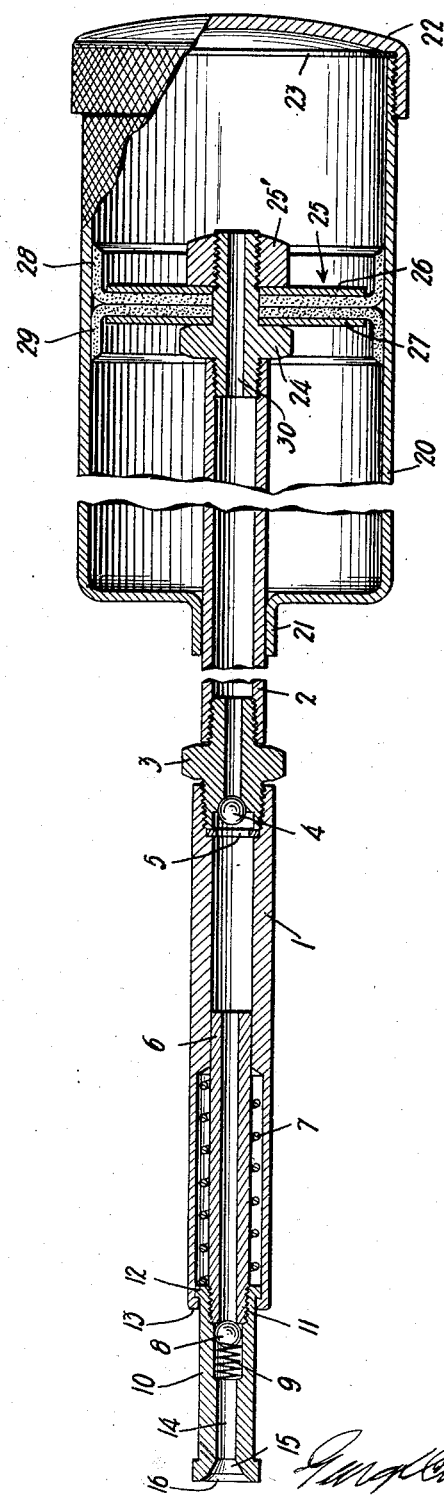

1,750,151

UNITED STATES PATENT OFFICE

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY

GREASE GUN

Application filed May 12, 1927. Serial No. 190,727.

My present invention, like that of my prior application Ser. No. 104,566, filed April 26, 1926, is shown as embodied in an apparatus that includes a nozzle or coupling in combination with a grease gun, for forcing grease through the ducts of bearings on automobiles and other machinery, particularly in cases where the duct inlets are normally closed by nipples having ball inlet check valves, as in expired British patent to Alley and Woodvine, No. 21,893, of 1906, Oct. 4.

For my purpose, it is not necessary that the nipples be exteriorly screw-threaded, as in said British patent, or that they be provided with equivalent bayonet securing means, as in many other patents, as there are various other forms of nipples and ducts, with and without securing means and valves, for which the novel features of my device may be readily adapted. In fact, my invention is best applied in connection with guns for pumping grease directly into a nipple, by reciprocating the reservoir end of the device, and there is decided advantage in having no securing means whatever, the charging nozzle being held in face contact with the end of the nipple. Thus, when the reservoir part is manually reciprocated and slides longitudinally on the nozzle stem, the latter will be free for slight angular yield, thus avoiding lateral strains such as ordinarily result from the hand reciprocation, if the stem were held in rigid alignment with the nipple.

My present invention relates more particularly to a simplified, self-contained arrangement whereby screws, springs or other pressure feed devices for expelling grease from the reservoir, are entirely dispensed with.

The above and other features of my invention may be more fully understood from the following description in connection with the accompanying drawings, in which The figure shows one form of grease gun and pumping nozzle in longitudinal section.

In the drawings, the cylinder member 1 of my pump is shown as rigidly mounted on the end of a hollow piston rod 2 by means of a coupling member 3 at the outer end of which is a ball check 4 held in place by disc 5 having an opening such, for example, as a slit to permit passage of the grease. The tube 6 which is the piston member of the pump reciprocating in the cylinder 1, is surrounded by a spring 7 normally returning it to the forward or retracted position. There is an outlet check valve 8 at the exit end of the piston tube, housed in an enlargement 9 of the nozzle member 10, which is secured to the forward end of the piston 6 by screw thread 11, and is provided with shoulders 12 affording a guide for this end of the piston and also serving as an abutment for thrust of spring 7. The shoulder 12 is shown as having its outward movement limited by a spun in annulus 13 at the forward end of the cylinder element 1.

This nozzle element 10 is formed with an axial passage 14, which terminates at its forward end with a flaring cone 15, adapted for endwise engagement with the inlet end of the nipple into which the grease is to be pumped and said cone is preferably surrounded by a still flatter cone surface 16, which is useful as an assistance in guiding the nozzle cone 15 into operative engagement with said end of the nipple.

According to the illustrative form of the present invention, the grease reservoir is shown as including a cylinder 20 formed at one end with a sleeve or bearing 21, slidable on the piston rod 2, and a cover 22 screwed over the threaded outer end of the cylinder, a fibre washer 23 being interposed between the cap or cover 22 and the outer end of the cylinder. Preferably, the end with the sleeve 21 is integral with the circumferential surface of the cylinder and the peripheral surfaces of the cover 22 and the cylinder 20 are roughened or knurled to facilitate unscrewing the cap or cover 22 from the cylinder 20. Screwed into the rear end of the piston rod 2 is a coupling 24 which carries on its opposite end a piston 25 which is held in position on the coupling by means of a nut screwed on the rearward end thereof. The piston comprises two clamping plates 26 and 27 between which are positioned two oppositely directed cup leather packings, 28, 29. Cup leather 28 holds the pressure that is applied to the grease for expelling it, while 29 holds the suction, thereby preventing the piston from leaving the confined grease. This suction also is usable for drawing a new supply of grease into the reservoir when the cap 22 has been removed.

A convenient way of working the device for filling the grease-ducts of an automobile or other machine is to grasp the pump cylinder 1 in one hand and while supporting the device in any convenient manner press the cone 15 against the end of the nipple fitting such as is commonly used on such grease ducts. It is to be understood that screw fittings or other coupling means can be empoyed, if desired. Upon the nozzle being held against endwise movement by engagement with such a fitting, the operator pushes endwise on the grease cylinder, thus shoving the cylinder forward on the hollow piston rod 2 and applying pressure to grease confined between the cover 22 and the piston 25 to force the same through the passage 30 in said coupling 24 into the hollow piston rod 2, from which the grease may pass through the coupling 3 and ball check 4 to the cylinder member 1 of the pump proper, return movement of the grease being prevented by said ball check 4. The cylinder 1 will also be pushed along the piston 6 comprising the spring 7 and expel grease past the outlet check valve 8 and through the nozzle orifice at 15. The hand pressure being then relieved, the spring 7 will continue holding the nozzle in firm contact with the nipple, while the cylinder element 1 is being retracted. At the beginning of the retracting movement, the outlet check valve 8 will automatically seat and grease in the reservoir which has been subjected to pressure between the piston 25 and the cover 22 will be sucked past the inlet check 4 into the cavity of the cylinder 1. Thereupon, a second forcing movement will automatically cause closure of valve 4 and opening of valve 8 as first above described.

It will be evident that the moving element, the piston, in my pump, cannot possibly deliver dirt into the grease reservoir. If any dirt can find its way past the bearing surface of shoulder 12, no harm can result, certainly not for a very long time, because it would have to work its way the length of the spring cavity before it could even reach the piston head. If it should reach this point, it is practically impossible for it to penetrate farther inward, because the only time the piston travels inwardly in the proper direction, the internal cavity is subject to the great internal pressure applied on the grease, and if there is any leakage, it will be outward leaking of grease, tending to carry dirt away from the interior.

It will also be evident that dirt cannot possibly be drawn into the grease compartment of the cylinder 20 during operation of the device. The structure is very simple and there is nothing to maintain a heavy pressure on the grease when the gun is not in use.

I claim:

1. A grease gun including a cylindrical grease reservoir having at one end a head formed with a central axial slide bearing and at the other with a detachable closure permitting replenishment of the grease, a piston slidable in said reservoir and providing grease space between the same and the detachable closure, said piston having oppositely directed cup washers, one to prevent outleak of grease under pressure in one direction and the other to prevent inleak of air or dirt upon traction in the opposite direction; a hollow piston rod extending through said piston to said grease space, projecting through said central axial bearing in the head of the reservoir and providing an outlet for the grease from the reservoir, and an outlet non-return valve for said hollow piston, in combination with a high pressure pump secured to and coaxial with said hollow piston rod at the outlet end thereof, said pump including a tubular member having a bore of two diameters, connected by an annular shoulder, the smaller bore constituting a pump cylinder forming an extension in alignment with and receiving grease from said hollow piston rod and the larger bore being located beyond said pump bore to afford a guide surface; the piston of the pump consisting of a tube slidably fitting said smaller bore and provided with a guide fitting said larger bore; and a spring, housed in the annular space between said larger bore and the tubular piston, anchored at one end on the annular shoulder between the smaller bore and the larger bore and at the other end on said piston and substantially fitting the exterior thereof.

2. A grease gun including a cylindrical grease reservoir having at one end a head formed with a central axial slide bearing and at the other with a detachable closure permitting replenishment of the grease, a piston slidable in said reservoir and providing grease space between the same and the detachable closure; a hollow piston rod extending through said piston to said grease space, projecting through said central axial bearing in the head of the reservoir and providing an outlet for the grease from the reservoir, and an outlet non-return valve for said hollow piston, in combination with a high pressure pump secured to and coaxial with said hollow piston rod at the outlet end thereof, said pump including a tubular member having a bore of two diameters, connected by an annular shoulder, the smaller bore constituting a pump cylinder forming an extension in alignment with and receiving grease from said hollow piston rod and the larger bore being located beyond said pump bore to afford a guide surface; the piston of the pump consisting of a tube slidably fitting said smaller bore and guided in said guide surface; and a spring, housed in the annular space between said larger bore and the tubular piston, anchored at one end on the annular shoulder between the smaller bore and the larger bore and at the other end on said piston and substantially fitting the exterior thereof.

Signed at New York city in the county of New York, and State of New York, this 11th day of May, A. D. 1927.

HERMAN ALBERTINE.